UNITED STATES PATENT OFFICE.

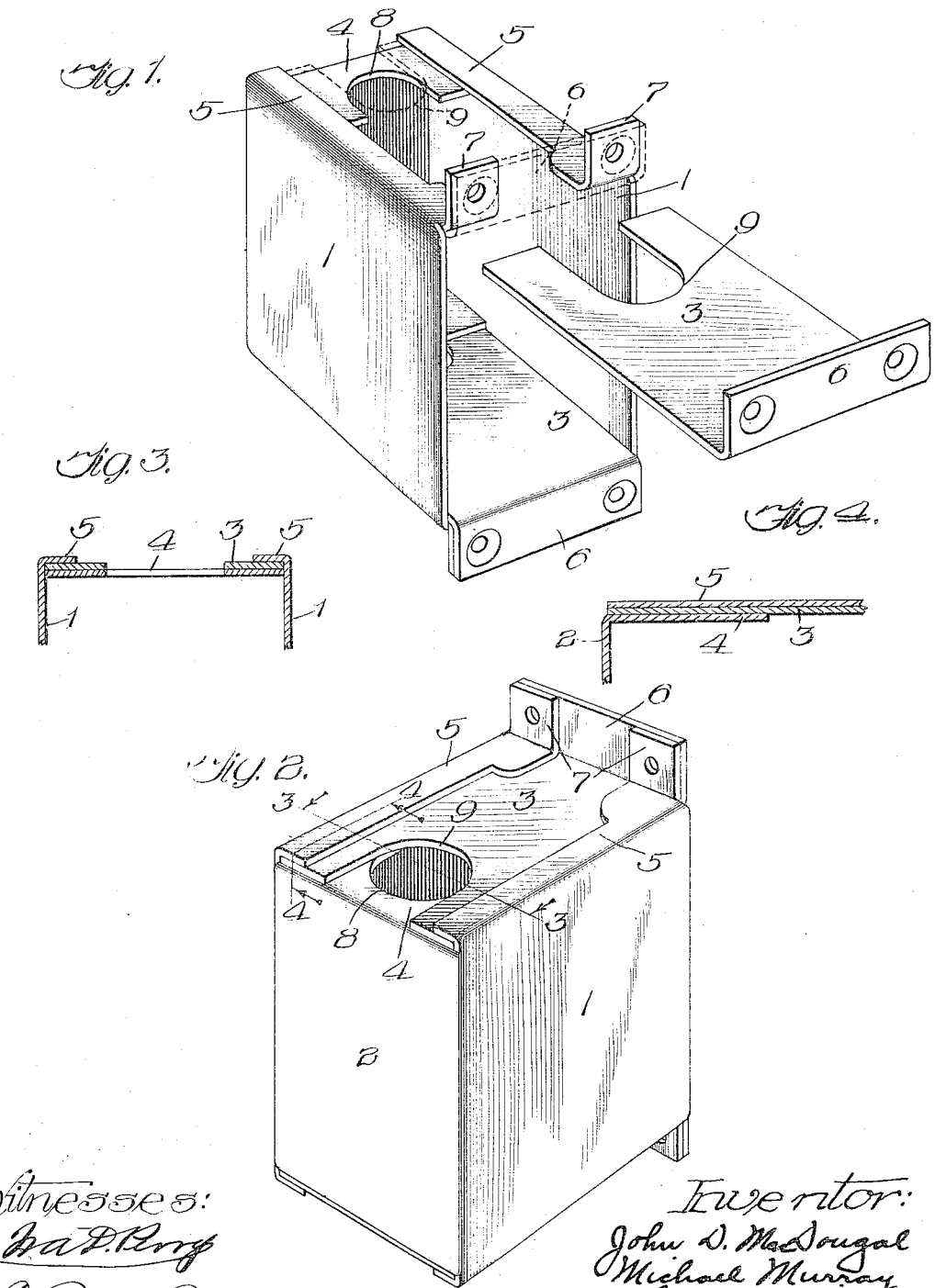

MICHAEL MURRAY AND JOHN D. MacDOUGAL, OF CHICAGO, ILLINOIS, ASSIGNORS, BY MESNE ASSIGNMENTS, TO FEDERAL ELECTRIC COMPANY, OF CHICAGO, ILLINOIS, A CORPORATION OF ILLINOIS.

ELECTRIC WALL-BOX.

983,162.  Specification of Letters Patent.  Patented Jan. 31, 1911.

Application filed January 25, 1909. Serial No. 474,011.

*To all whom it may concern:*

Be it known that we, MICHAEL MURRAY and JOHN D. MACDOUGAL, citizens of the United States, residing at Chicago, in the county of Cook and State of Illinois, have invented certain new and useful Improvements in Electric Wall-Boxes, of which the following is a specification.

This invention relates to boxes such as are placed in the walls of buildings to receive the ends of electric conduits or wires, and intended to contain switches, fuses, and the like.

The object of the invention is to produce a box which is especially adapted to facilitate entering the conduit into the box.

In the accompanying drawings, Figure 1 is a perspective view of a wall box embodying the features of our invention. Fig. 2 is a perspective view of the box from another angle. Fig. 3 is a section on line 3 3 of Fig. 2. Fig. 4 is a section on line 4 4 of Fig. 2.

The embodiment herein shown of our invention is a box having two opposite side walls 1 which are connected together by a rear wall 2. The front side or end of the box may be open, as herein shown, said side in practice being closed by a suitable cover carrying switches or the like, such cover not being shown herein. Either or both of the remaining sides of the box, in this instance the top and bottom walls, may be removable. In the form herein shown each consists of a panel 3, the rear or inner portion of which is adapted to be slid between an inwardly extending flange 4 on the rear wall 2 and inwardly extending flanges 5 on the side walls 1. The flanges 4 and 5 are spaced apart, as indicated in Figs. 2, 3 and 4, to provide just sufficient space to receive the panel 3. The forward end of the panel has an outturned ear or flange 6 arranged to be secured to ears 7 upon the forward ends of the flanges 5 by means of screws (not shown) extending through openings in said ears into the wall of the building or other supporting structure. It will be seen that these screws serve to support the box in place as well as to secure the removable walls in position. In each of the flanges 4 (in the form shown in Fig. 1) is formed a recess 8 and in the inner end of the panels 3 are notches 9 of substantially the same width as the width of the outer end of the recesses 8. When the panels 3 are in place, each recess 8 and notch 9 form an opening, as shown in Fig. 2, through which a conduit may extend. When but one conduit is to be attached to the box, only one panel having a notch 9 therein need be used, the other panel not being slotted, as indicated in Fig. 2, or the other side may be of any common or suitable construction.

In use, the body of the box is positioned in the wall, the ends of the conduits inserted through the upper or lower sides of the box, the removable panel or panels 3 slid into place, and the whole secured in the wall by means of screws fastened through the ears 6 and 7. It will be seen that the formation of the upper and lower walls of the box provides large openings through which the conduits may be readily inserted, and that when the removable panel or panels are placed in position, the conduits will be embraced and held in proper position between the recessed portions of the panels and the flanges 4.

The panel or panels 3 fit within guides formed by the flanges 4 and 5 tightly enough to prevent any danger from fire due to arcing or sparks in the box.

As will be apparent from the drawings, the body of the box, to wit, the walls 1 and the rear wall 2 with the flanges 4 and 5 thereon, may be formed from an integral piece of sheet metal.

It will be understood that in details of construction changes may be made from the embodiment herein shown without departing from the scope of our invention; therefore we do not limit ourselves to the precise form shown and described.

We claim as our invention:

1. An outlet box having an inturned flange on one of its walls, said flange having a recess on its inner side, inturned flanges on two opposite walls overlying said first mentioned flange, said second mentioned flanges having ears at one end thereof, a plate slidable between said first mentioned flange and said second mentioned flanges, said plate having a notch therein adapted to register with said recess, and an ear on said plate arranged to lie adjacent the ears on said flanges when the plate is in its closed position.

2. An outlet box comprising an end wall and two side walls, a relatively wide inwardly extending flange on said end wall, said flange having a notch in its inner side, an inturned flange on each of said side walls overlying the first mentioned flange and forming guideways, angular ears on the forward ends of the side wall flanges, a removable panel having its inner end slidable in the guideways formed between the flange on said end wall and the flanges on said side walls, said panel having a notch in its inner edge arranged to register with the notch in the end wall flange, and an angular ear on the outer end of said panel arranged to lie against the ears on the side wall flanges, said panel ear and said side-wall-flange ears having coinciding openings therein for the reception of fastening devices to hold the panel in place and secure the box in the wall.

3. An outlet box having side walls and an end wall, a relatively wide, inwardly-extending flange on said end wall, said flange having a notch on its inner edge, inturned flanges on two opposite side walls overlying said end wall flange and forming guideways therebetween, angular attaching ears at one end of said side wall flanges, said walls, flanges and ears being bent up from an integral sheet of metal, a panel slidable in said guideways and having a notch adapted to register with the first mentioned notch when the panel is closed, and an angular ear at one end of said panel adapted to lie alongside of said attaching ears when the panel is in its closed position.

4. An outlet box having inturned flanges on its walls to form guideways, attaching ears on the ends of certain of said flanges, a panel slidable in said guideways, and an ear on one end of said panel adapted to lie against said attaching ears when the panel is in its closed position.

MICHAEL MURRAY.
JOHN D. MacDOUGAL.

Witnesses:
C. PAUL PARKER,
GEORGE L. CHINDAHL.